US009852062B2

(12) United States Patent
Chyan et al.

(10) Patent No.: US 9,852,062 B2
(45) Date of Patent: Dec. 26, 2017

(54) MEMORY CONTROLLER AND ACCESSING SYSTEM UTILIZING THE SAME

(71) Applicant: Silicon Motion, Inc., Jhubei, Hsinchu County (TW)

(72) Inventors: Yu-Wei Chyan, Hsinchu (TW); Jiyun-Wei Lin, Xinpu Township, Hsinchu Count (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 344 days.

(21) Appl. No.: 14/195,050

(22) Filed: Mar. 3, 2014

(65) Prior Publication Data

US 2014/0304458 A1    Oct. 9, 2014

Related U.S. Application Data

(60) Provisional application No. 61/807,869, filed on Apr. 3, 2013.

(30) Foreign Application Priority Data

Nov. 12, 2013    (TW) .............................. 102140985 A (51) Int. Cl.
*G06F 12/00*    (2006.01)
*G06F 12/02*    (2006.01)
(Continued)

(52) U.S. Cl.
CPC ............ *G06F 12/0246* (2013.01); *G06F 3/06* (2013.01); *G06F 3/061* (2013.01); *G06F 3/0655* (2013.01);
(Continued)

(58) Field of Classification Search
CPC ............. G06F 12/0246; G06F 13/1694; G06F 13/385; G06F 13/16; G06F 3/06
See application file for complete search history.

(56) References Cited

U.S. PATENT DOCUMENTS 8,001,304 B2    8/2011  Yung et al.
9,251,454 B2 *  2/2016  Ou .......................... G06K 19/07
(Continued)

FOREIGN PATENT DOCUMENTS

CN    101971152 A    2/2011
CN    102123380 A    7/2011
(Continued)

*Primary Examiner* — Reginald Bragdon
*Assistant Examiner* — Hannah A Faye-Joyner
(74) *Attorney, Agent, or Firm* — McClure, Qualey & Rodack, LLP (57) ABSTRACT

A memory controller including a first transmittal module, a clock pin, a second transmittal module, a first control module and a second control module is disclosed. The first transmittal module includes a specific pin. The clock pin receives a clock signal. The first transmittal module and the clock pin constitute an embedded multimedia card (eMMC) interface. The second transmittal module and the clock pin constitute a universal flash storage (UFS) interface. The first control module communicates with an external host via the first transmittal module according to the clock signal when a level of the specific pin is at a first level. The second control module communicates with the external host via the second transmittal module according to the clock signal when the level of the specific pin is at a second level. The first level exceeds the second level.

20 Claims, 7 Drawing Sheets

(51) Int. Cl.
*G06F 3/06* (2006.01)
*G06F 13/16* (2006.01)
*G06F 13/38* (2006.01)
*G06F 13/14* (2006.01)

(52) U.S. Cl.
CPC ............ *G06F 3/0679* (2013.01); *G06F 13/16* (2013.01); *G06F 13/1694* (2013.01); *G06F 13/385* (2013.01); *G06F 13/14* (2013.01); *Y02B 60/1228* (2013.01); *Y02B 60/1235* (2013.01)

(56) References Cited

U.S. PATENT DOCUMENTS

| 2010/0262753 A1* | 10/2010 | Richmond .......... G06F 13/4234 711/103 |
| 2012/0042116 A1 | 2/2012 | Park et al. |
| 2015/0255167 A1 | 9/2015 | Gillingham et al. |

FOREIGN PATENT DOCUMENTS

| TW | 200901194 | 1/2009 |
| TW | 200939027 | 9/2009 |

\* cited by examiner

MEMORY CONTROLLER AND ACCESSING SYSTEM UTILIZING THE SAME

CROSS REFERENCE TO RELATED APPLICATIONS

This application claims the benefit of U.S. Provisional Application No. 61/807,869, filed on Apr. 3, 2013, which application is hereby incorporated by reference in its entirety.

This Application claims priority of Taiwan Patent Application No. 102140985, filed on Nov. 12, 2013, the entirety of which is incorporated by reference herein.

BACKGROUND OF THE INVENTION

Field of the Invention

The invention relates to a memory controller, and more particularly to a memory controller that is capable of utilizing different protocols to communicate with an external host.

Description of the Related Art

NAND flashes have become a mainstream storage medium and are widely used in electronic devices. NAND flashes are manufactured into memory cards or flash disks. The memory cards comprise compact flash (CF) cards, multimedia cards (eMMCs), smart media (SM) cards, and secure digital (SD) cards.

BRIEF SUMMARY OF THE INVENTION

In accordance with an embodiment, a memory controller comprises a first transmittal module, a clock pin, a second transmittal module, a first control module and a second control module. The first transmittal module is configured to transmit data and comprises a specific pin. The clock pin receives a clock signal. The first transmittal module and the clock pin constitute an embedded multimedia card (eMMC) interface. The second transmittal module is configured to transmit data. The second transmittal module and the clock pin constitute a universal flash storage (UFS) interface. The first control module communicates with an external host via the first transmittal module according to the clock signal when a level of the specific pin is at a first level. The second control module communicates with the external host via the second transmittal module according to the clock signal when the level of the specific pin is at a second level. The first level exceeds the second level.

In accordance with another embodiment, a memory controller comprises a first transmittal module, a specific pin, a clock pin, a second transmittal module, a first control module and a second control module. The first transmittal module is configured to transmit data. The clock pin receives a clock signal. The first transmittal module and the clock pin constitute an embedded multimedia card (eMMC) interface. The second transmittal module is configured to transmit data. The second transmittal module and the clock pin constitute a universal flash storage (UFS) interface. The first control module communicates with an external host via the first transmittal module according to the clock signal when a level of the specific pin is at a first level. The second control module communicates with the external host via the second transmittal module according to the clock signal when the level of the specific pin is at a second level, wherein the first level exceeds the second level.

In accordance with a further embodiment, an accessing system comprises a memory array, an external host and a memory controller. The memory array stores data. The external host sends a clock signal. The memory controller accesses the memory array according to the clock signal and comprises a first transmittal module, a clock pin, a second transmittal module, a first control module and a second control module. The first transmittal module is configured to transmit data and comprises a specific pin. The clock pin receives a clock signal. The first transmittal module and the clock pin constitute an embedded multimedia card (eMMC) interface. The second transmittal module is configured to transmit data. The second transmittal module and the clock pin constitute a universal flash storage (UFS) interface. The first control module accesses the memory array according to the clock signal and communicates with the external host via the first transmittal module when a level of the specific pin is at a first level. The second control module accesses the memory array according to the clock signal and communicates with the external host via the second transmittal module when the level of the specific pin is at a second level, wherein the first level exceeds the second level.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
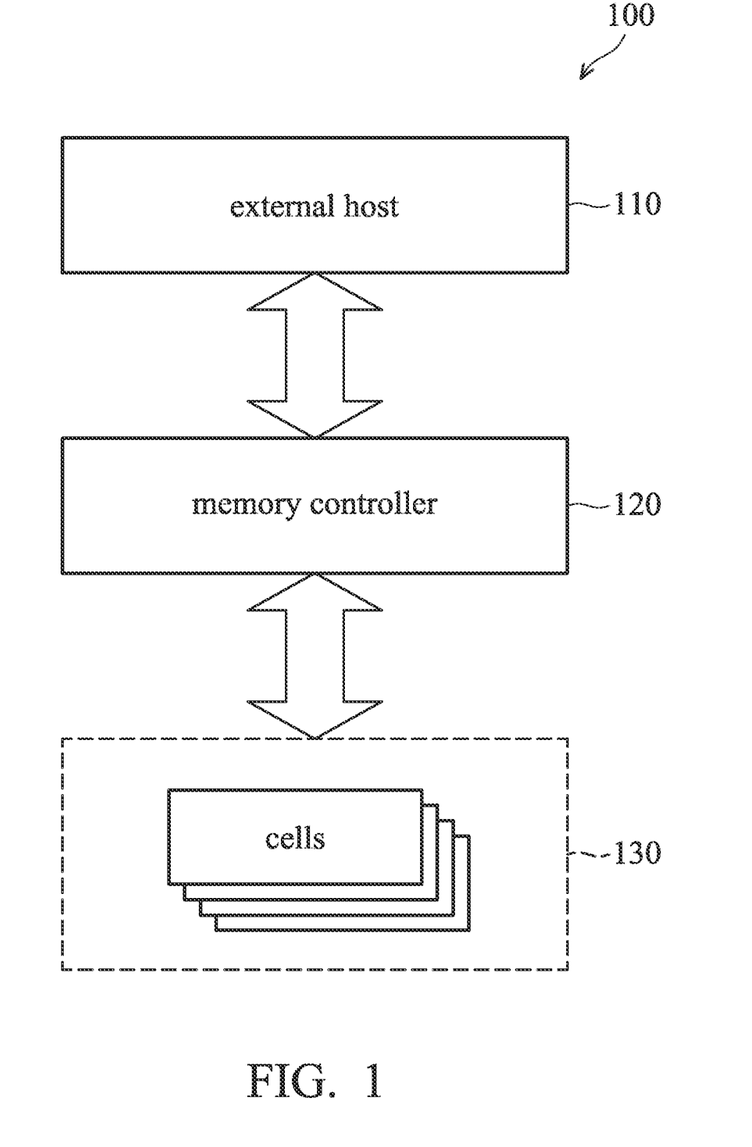
FIG. 1 is a schematic diagram of an exemplary embodiment of an accessing system, in accordance with some embodiments.

FIG. 1 is a schematic diagram of an exemplary embodiment of an accessing system, in accordance with some embodiments. The accessing system 100 comprises an external host 110, a memory controller 120 and a memory array 130. The external host 110 accesses the memory array 130 via the memory controller 120. The invention does not limit the kind of external host 110. Any device can serve as the external host 110, as long as the device comprises computing functions.

In this embodiment, the memory array 130 comprises a multitude of cells. The cells are arranged in a matrix. In some embodiments, the memory controller 120 and the memory array 130 are integrated into a memory device, such as a flash disk or a memory card. The invention does not limit the kind of memory device. For example, the memory device is a non-volatile memory or a volatile memory.

In this embodiment, the memory controller 120 is a complex controller with an eMMC interface and a universal flash storage (UFS) interface. When the external host 110 sends control commands according to an eMMC protocol or a UFS protocol, the memory controller 120 is capable of accessing the memory array 130 according to the control commands. Since the memory controller 120 is capable of identifying the kind of protocols, the memory controller 120 can apply in the different kinds of hosts. Therefore, the applicability and compatibility of the memory controller 120 are increased.

Figure 2:
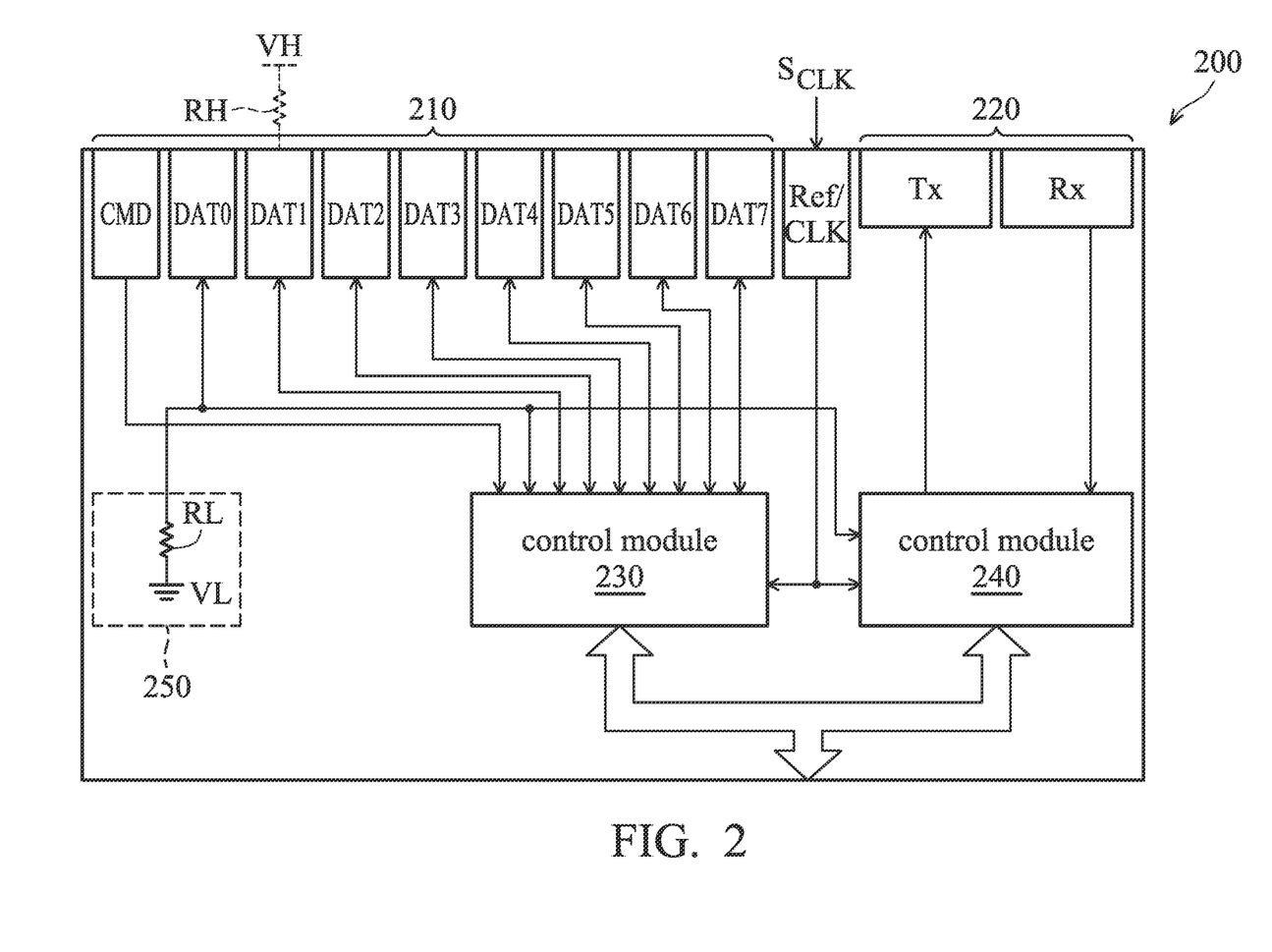
FIGS. 2-7 are schematic diagrams of exemplary embodiments of a memory controller, in accordance with some embodiments.

FIG. 2 is a schematic diagram of an exemplary embodiment of a memory controller, in accordance with some embodiments. The memory controller 200 comprises transmittal modules 210, 220, a clock pin Ref/CLK, and control modules 230 and 240. In this embodiment, the transmittal module 210 and the clock pin Ref/CLK constitute an eMMC interface, and the transmittal module 220 and the clock pin Ref/CLK constitute a UFS interface. The clock pin Ref/CLK receives a clock signal $S_{CLK}$. In one embodiment, the clock signal $S_{CLK}$ is provided by the external host 110. Since the transmittal modules 210 and 220 share a clock pin, the usable space of the memory controller 200 is increased and the cost of the memory controller 200 is reduced.

In one embodiment, the transmittal module 210 comprises a command pin CMD and data pins DAT0~DAT7. The command pin CMD receives a control command. The data pins DAT0~DAT7 transmit data. The invention does not limit the number of data pins. In another embodiment, the transmittal module 210 comprises a single data pin or four data pins.

The transmittal module 220 comprises a receiving pin Rx and a transmittal pin Tx. The receiving pin Rx is configured to receive data provided by the external host 110. The transmittal pin Tx is configured to provide data to the external host 110. In this embodiment, the receiving pin Rx and the transmittal pin Tx transmit data according to a serial method.

The control modules 230 and 240 communicate with the external host 110 according to the level of a specific pin. In this embodiment, the data pin DAT0 serves as a specific pin, but the disclosure is not limited thereto. In one embodiment, any data pin is capable of serving as the specific pin. In some embodiments, the control modules 230 and 240 are integrated into a signal control chip, as discussed in more detail below.

Since the data pin DAT0 serves as the specific pin, a setting module 250 is coupled to the data pin DAT0 to set the level of the data pin DAT0. In one embodiment, the setting module 250 comprises a pull-low resistor RL. One terminal of the pull-low resistor RL is coupled to the data pin DAT0 and another terminal of the pull-low resistor RL receives a low level VL. Therefore, when the data pin DAT0 does not receive other signal, the level of the data pin DAT0 is maintained at the low level VL. The invention does not limit the circuit structure of the setting module 250. Any element or circuit can serve as the setting module 250, as long as the element or circuit is capable of providing a predetermined level to the data pin DAT0.

In this embodiment, the control modules 230 and 240 operate according to the level of the data pin DAT0. The invention does not limit the circuit structures of the control modules 230 and 240. In one embodiment, the control module 230 is an eMMC controller, and the control module 240 is a UFS controller.

If the external host 110 transmits data according to an eMMC protocol, when the external host 110 is coupled to the memory controller 120, a pull-high resistor RH of the external host 110 is coupled to the pull-low resistor RL in serial. Since one terminal of the pull-high resistor RH receives a high level VH, the level of the data pin DAT0 is switched from the low level VL to the high level VH. When the level of the data pin DAT0 is at a first level higher than the low level VL, the control module 230 communicates with the external host 110 via the transmittal module 210 according to the clock signal $S_{CLK}$. At this time, the control module 240 stops working.

If the external host 110 transmits data according to a UFS protocol, when the external host 110 is coupled to the memory controller 120, the level of the data pin DAT0 is not interfered with by the external host 110. Therefore, the level of the data pin DAT0 is maintained at the low level VL. In this embodiment, since the level of the data pin DAT0 is at a second level (e.g. the low level VL), the control module 240 communicates with the external host 110 via the transmittal module 220 according to the clock signal S.sub.CLK. At this time, the control module 230 stops working. In one embodiment, the high level VH is higher than the low level VL.

In some embodiments, when the control module 230 or 240 does not receive the clock signal $S_{CLK}$ or the operation voltages, the control module 230 or 240 is deactivated to stop working. Since the control modules 230 and 240 do not work simultaneously, the power consumption of the accessing system 100 is reduced.

Figure 3:
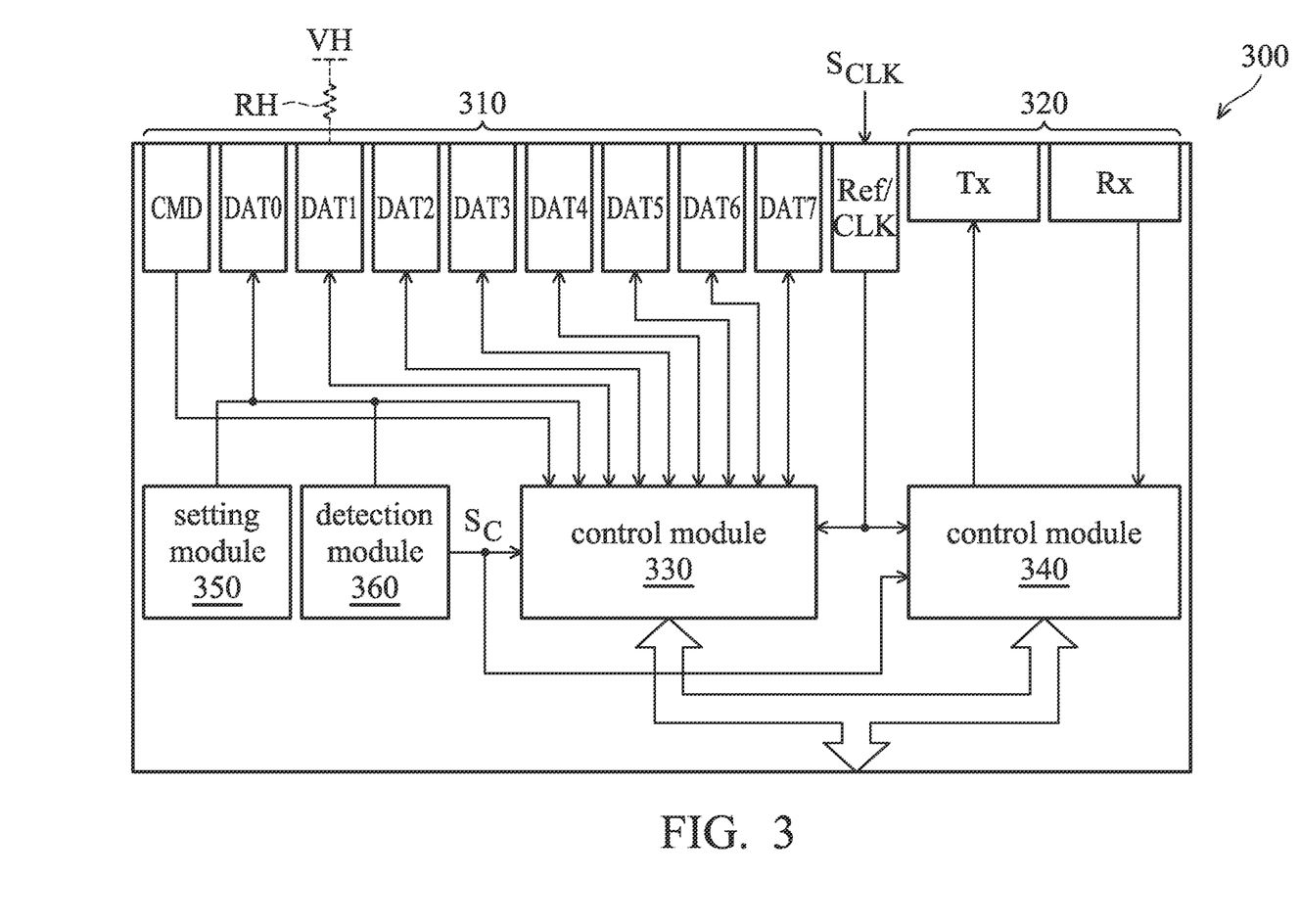

FIG. 3 is a schematic diagram of another exemplary embodiment of a memory controller, in accordance with some embodiments. FIG. 3 is similar to FIG. 2 with the exception that the memory controller 300 further comprises a detection module 360. In some embodiments, the detection module 360 is integrated in at least one of the control modules 330 and 340. The detection module 360 generates a control signal $S_C$ according to the level of the specific pin, such as the data pin DAT0.

In this embodiment, when the level of the data pin DAT0 is equal to a first level higher than the low level VL, the control signal $S_C$ is in a first state. Therefore, the control module 330 communicates with the external host 110 via the transmittal module 310 according to the clock signal $S_{CLK}$. When the level of the data pin DAT0 is equal to a second level (e.g. the low level VL), the control signal $S_C$ is in a second state. Therefore, the control module 340 communicates with the external host 110 via the transmittal module 320 according to the clock signal $S_{CLK}$.

Figure 4:
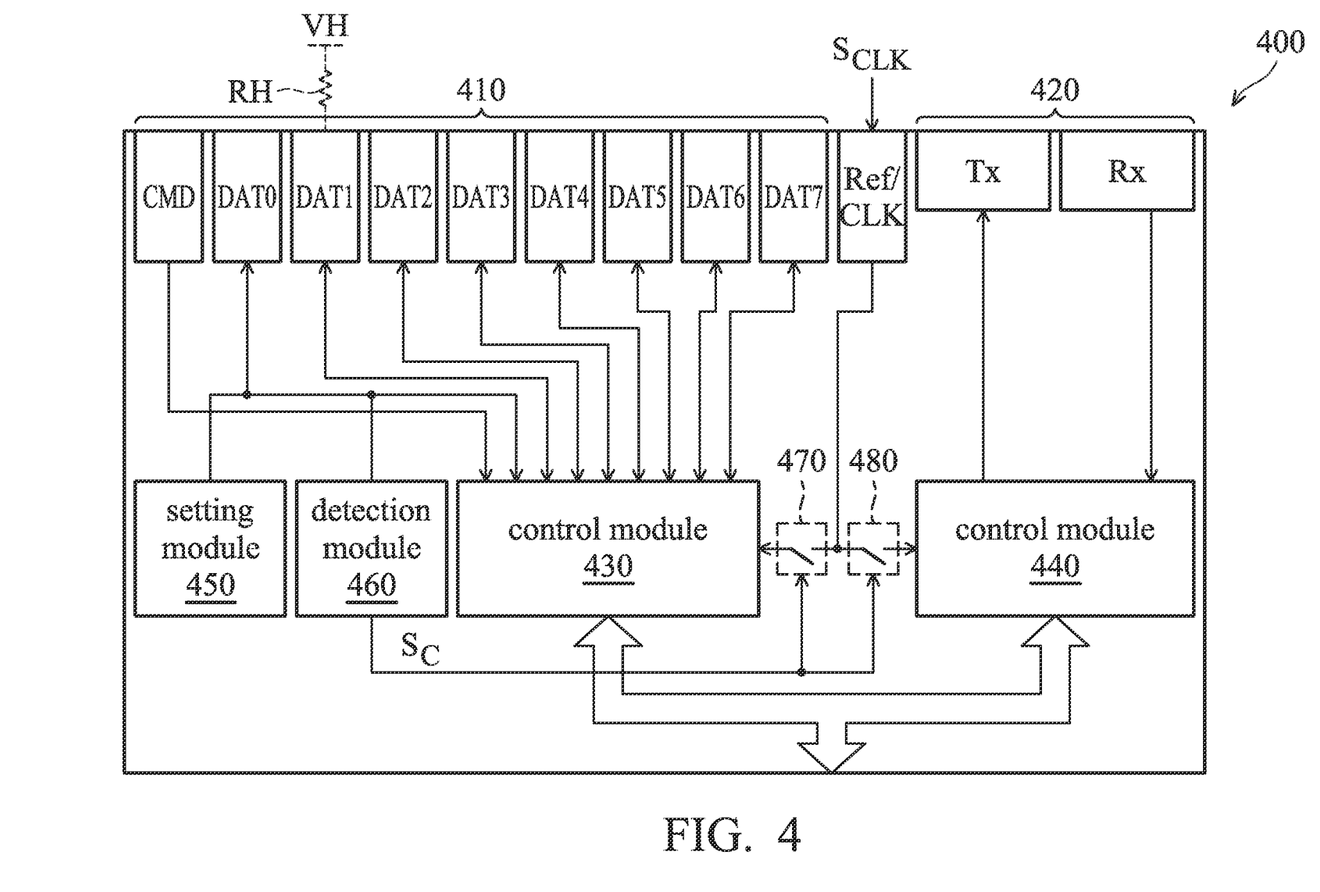

FIG. 4 is a schematic diagram of another exemplary embodiment of a memory controller, in accordance with some embodiments. FIG. 4 is similar to FIG. 3 with the exception that the memory controller 400 further comprises switches 470 and 480. In this embodiment, the switches 470 and 480 selectively transmit the clock signal $S_{CLK}$ according to the control signal $S_C$. In some embodiments, the switches 470 and 480 are not turned on simultaneously.

When the level of the specific pin (e.g. the data pin DAT0) is at the first level higher than the low level VL, the control signal $S_C$ is in the first state. Therefore, the switch 470 is turned on and the switch 480 is turned off. The switch 470 transmits the clock signal $S_{CLK}$ to the control module 430. The control module 430 communicates with the external host 110 via the transmittal module 410 according to the clock signal $S_{CLK}$. Since the switch 480 is turned off, the control module 440 cannot receive the clock signal $S_{CLK}$, thus, the control module 440 stops working.

When the level of the data pin DAT0 is equal to the second level (e.g. VL), the control signal $S_C$ is in the second state. Therefore, the switch 480 is turned on and the switch 470 is turned off. The switch 480 transmits the clock signal $S_{CLK}$ to the control module 440. The control module 440 communicates with the external host 110 via the transmittal module 420 according to the clock signal $S_{CLK}$. Since the switch 470 is turned off, the control module 430 cannot receive the clock signal $S_{CLK}$, thus, the control module 430 stops working.

Figure 5:
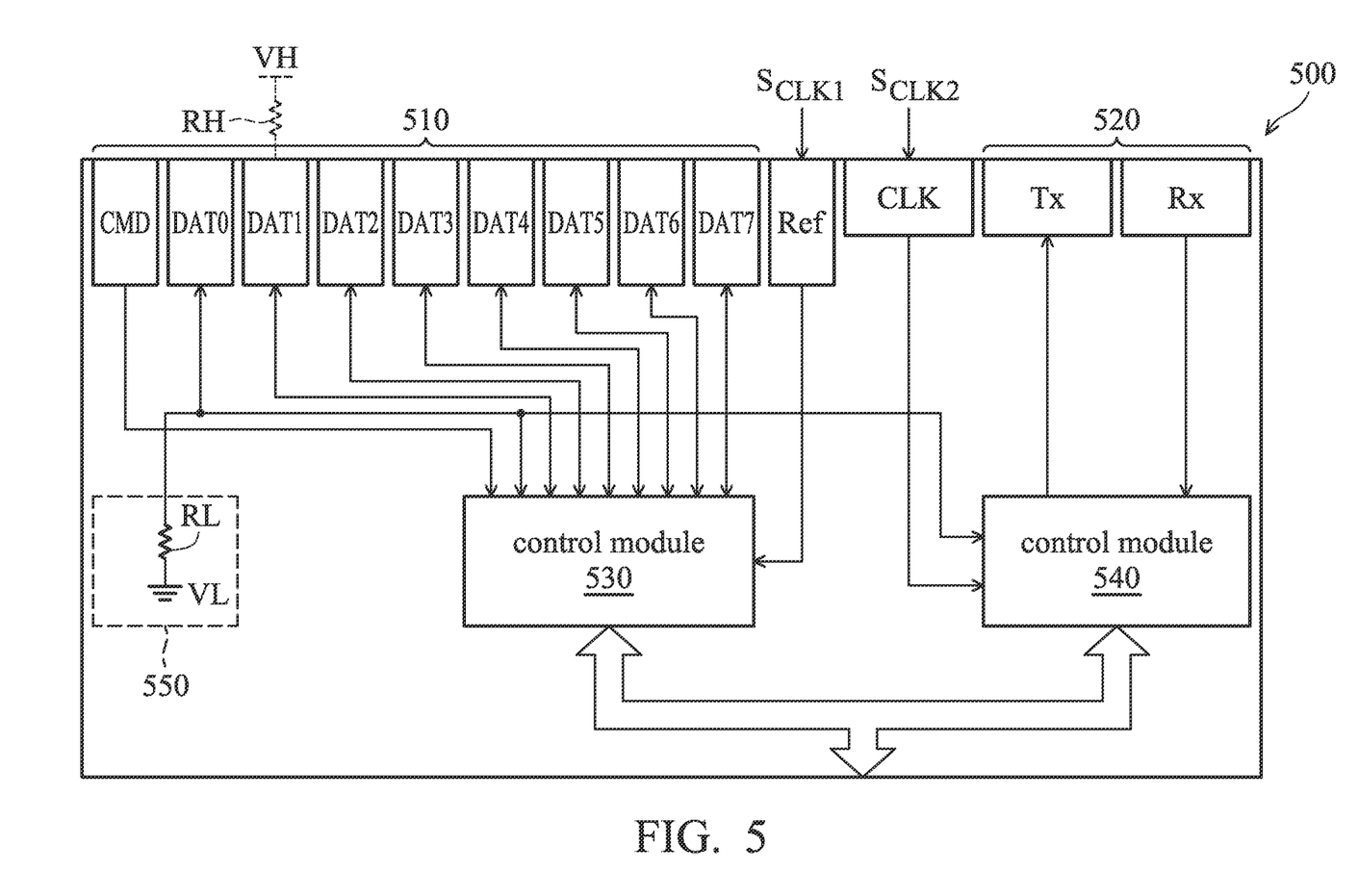

FIG. 5 is a schematic diagram of another exemplary embodiment of a memory controller, in accordance with some embodiments. FIG. 5 is similar to FIG. 2 with the exception that the memory controller 500 comprises two independent clock pins Ref and CLK. The clock pin Ref receives the clock signal $S_{CLK1}$. The clock pin CLK receives the clock signal $S_{CLK2}$. In this embodiment, the transmittal module 510 and the clock pin Ref constitute an eMMC interface, and the transmittal module 520 and the clock pin CLK constitute a UFS interface.

If the external host 110 transmits data according to an eMMC protocol, when the external host 110 is coupled to the memory controller 500, the level of the data pin DAT0 is changed, such as from the low level VL to the high level VH. Therefore, the control module 530 communicates with the external host 110 via the transmittal module 510 according to the clock signal $S_{CLK1}$ on the clock pin Ref. At this time, since the level of the data pin DAT0 is not at the low level VL, the control module 540 is deactivated. The invention does not limit how the control module 540 is deactivated. In one embodiment, the control module 540 is deactivated when the operation voltages or the clock signal $S_{CLK2}$ are not provided to the control module 540 such that the control module 540 stops working.

If the external host 110 transmits data according to a UFS protocol, when the external host 110 is coupled to the memory controller 500, the level of the data pin DAT0 is maintained at the low level VL. Therefore, the control module 540 communicates with the external host 110 via the transmittal module 520 according to the clock signal $S_{CLK2}$ on the clock pin CLK. At this time, the control module 530 is deactivated. In one embodiment, the control module 530 is deactivated when no operation voltage or no clock signal $S_{CLK1}$ is provided to the control module 530. In some embodiments, the independent clock pins Ref and CLK are applied to FIGS. 3 and 4.

Since the control modules 530 and 540 do not work simultaneously, the power consumption of the memory controller 500 can be reduced. Additionally, the level of the data pin DAT0 is determined to identify the protocol used by the external host 110 and then the memory controller communicates 500 with the external host 110 according to the identified protocol. The applicability and compatibility of the memory controller 500 are increased.

Figure 6:
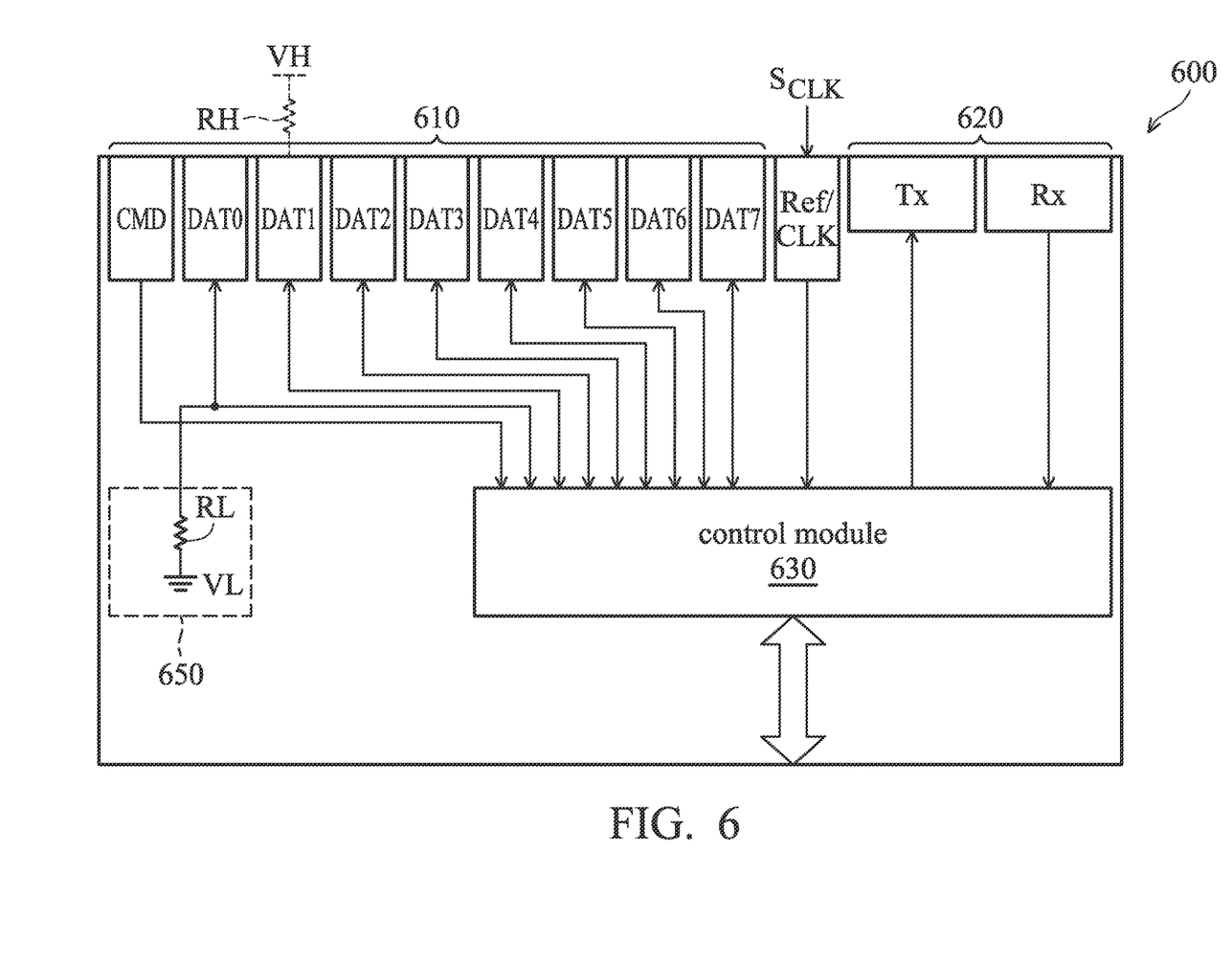

FIG. 6 is a schematic diagram of another exemplary embodiment of a memory controller, in accordance with some embodiments. FIG. 6 is similar to FIG. 2 with the exception that the memory controller 600 only comprises a single control module 630. In one embodiment, the control modules 230 and 240 shown in FIG. 2 are integrated to form the control module 630. In another embodiment, the independent clock pins shown in FIG. 5 can be applied in FIG. 6.

In this embodiment, when the level of the data pin DAT0 is at a high level, the control module 630 communicates with the external host 110 via the transmittal module 610 according to the clock signal $S_{CLK}$. When the level of the data pin DAT0 is at a low level, the control module 630 communicates with the external host 110 via the transmittal module 620 according to the clock signal $S_{CLK}$.

Figure 7:
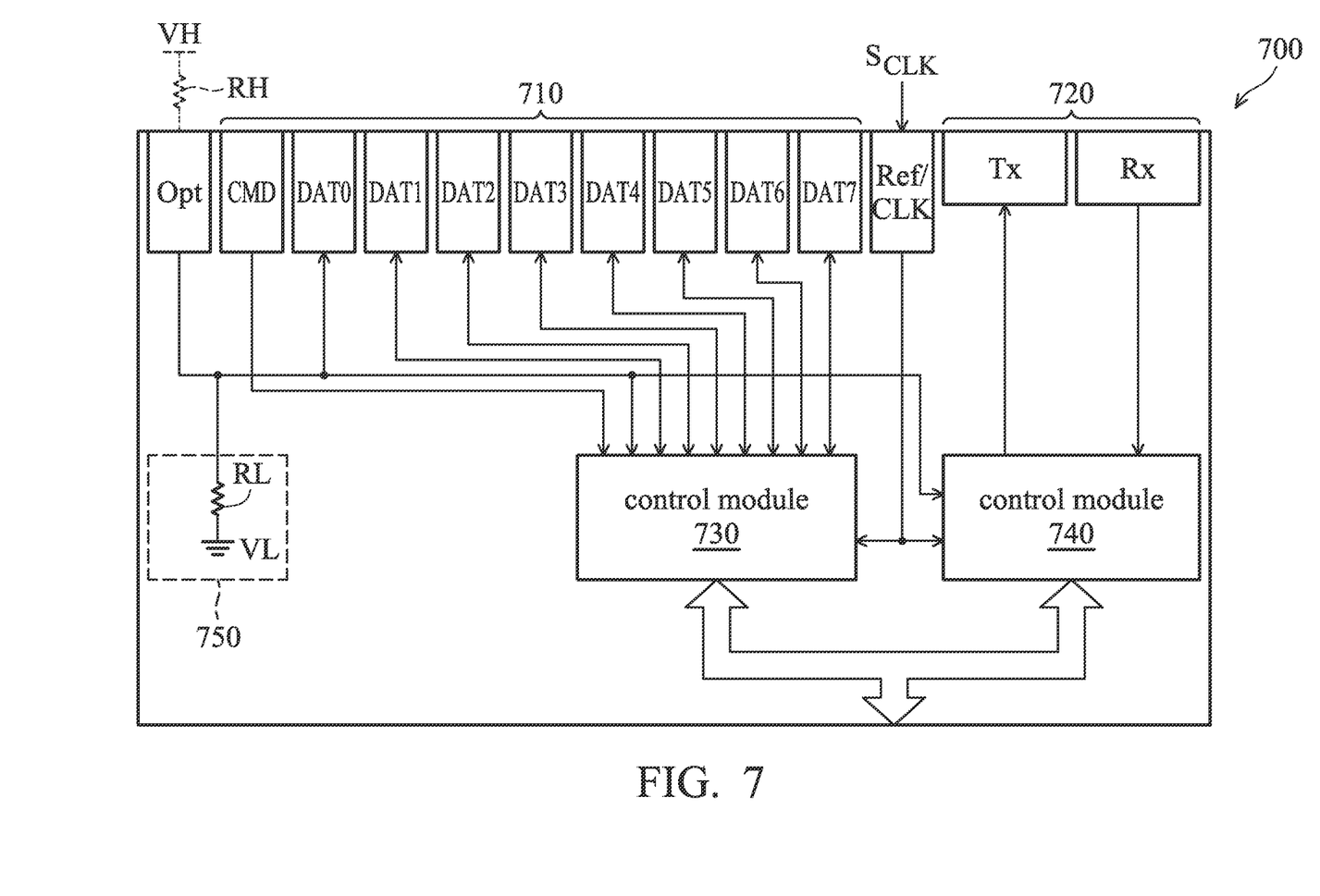

FIG. 7 is a schematic diagram of another exemplary embodiment of a memory controller, in accordance with some embodiments. FIG. 7 is similar to FIG. 2 with the exception that the memory controller 700 comprises an additional pin Opt. The additional pin Opt serves as a specific pin and is coupled to a setting module 750. The control modules 730 and 740 operate according to the level of the additional pin Opt.

If the external host 110 uses an eMMC protocol, when the external host 110 is coupled to the memory controller 700, a pull-high resistor RH is connected to the pull-low resistor RL in serial. In one embodiment, the level of the additional pin Opt is changed, such as from a low level VL to a high level VH. Therefore, the control module 730 communicates with the external host 110 via the transmittal module 710 according to the clock signal $S_{CLK}$. At this time, the control module 740 stops working.

If the external host 110 uses a UFS protocol, when the external host 110 is coupled to the memory controller 700, the level of the additional pin Opt is maintained at the low level VL. Therefore, the control module 740 communicates with the external host 110 via the transmittal module 720 according to the clock signal $S_{CLK}$. At this time, the control module 730 stops working. In some embodiments, the design of the additional pin Opt can be applied to FIGS. 3-6. Furthermore, the independent clock pins shown in FIG. 5 and the integrated control module shown in FIG. 6 can be respectively or simultaneously applied to FIG. 7.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory controller comprising:
a first transmittal module transmitting data;
a specific pin coupled to a setting module;
a clock pin receiving a clock signal, wherein the first transmittal module and the clock pin constitute an embedded multimedia card (eMMC) interface;
a second transmittal module transmitting data, wherein the second transmittal module and the clock pin constitute a universal flash storage (UFS) interface;
a first control module communicating with an external host via the first transmittal module according to the clock signal when a level of the specific pin is at a first level; and
a second control module communicating with the external host via the second transmittal module according to the clock signal when the level of the specific pin is at a second level, wherein the first level exceeds the second level, wherein the clock pin is shared by the first and second transmittal modules,
wherein when the first control module communicates with the external host via the first transmittal module, simultaneously, the second control module stops working, and wherein when the second control module communicates with the external host via the second transmittal module, simultaneously, the first control module stops working, and wherein each of the first and the second control modules receives a signal carried on the specific pin, but does not utilize the specific pin to transmit or receive communications with the external host.

2. The memory controller as claimed in claim 1, further comprising:
a first resistor comprising a first terminal and a second terminal, wherein the first terminal is coupled to the specific pin and the second terminal receives the second level.

3. The memory controller as claimed in claim 2, wherein when a second resistor of the external host is coupled to the first resistor in serial, the level of the specific pin is equal to the first level.

4. The memory controller as claimed in claim 2, wherein when the first resistor is not coupled to a second resistor of the external host, the level of the specific pin is equal to the second level.

5. The memory controller as claimed in claim 1, further comprising:
a detection module generating a control signal according to the level of the specific pin.

6. The memory controller as claimed in claim 5, wherein when the level of the specific pin is equal to the first level, the control signal is in a first state and the first control module communicates with the external host via the first transmittal module according to the clock signal, and when the level of the specific pin is equal to the second level, the control signal is in a second state and the second control module communicates the external host via the second transmittal module according to the clock signal.

7. The memory controller as claimed in claim 5, further comprising:
a first switch providing the clock signal to the first control module according to the control signal, wherein the first control module communicates with the external host via the first transmittal module according to the clock signal; and
a second switch providing the clock signal to the second control module according to the control signal, wherein the second control module communicates with the external host via the second transmittal module according to the clock signal.

8. A memory controller comprising:
a first transmittal module transmitting data;
a specific pin;
a clock pin receiving a clock signal, wherein the first transmittal module and the clock pin constitute an embedded multimedia card (eMMC) interface;
a second transmittal module transmitting data, wherein the second transmittal module and the clock pin constitute a universal flash storage (UFS) interface;
a first control module communicating with an external host via the first transmittal module according to the clock signal when a level of the specific pin is at a first level; and
a second control module communicating with the external host via the second transmittal module according to the clock signal when the level of the specific pin is at a second level, wherein the first level exceeds the second level, wherein the clock pin is shared by the first and second transmittal modules, wherein when the first control module communicates with the external host via the first transmittal module, simultaneously, the second control module stops working, and wherein when the second control module communicates with the external host via the second transmittal module, simultaneously, the first control module stops working, and wherein each of the first and the second control modules receives a signal carried on the specific pin, but does not utilize the specific pin to transmit or receive communications with the external host.

9. The memory controller as claimed in claim 8, further comprising:
a first resistor comprising a first terminal and a second terminal, wherein the first terminal is coupled to the specific pin and the second terminal receives the second level.

10. The memory controller as claimed in claim 9, wherein when a second resistor of the external host is coupled to the first resistor in serial, the level of the specific pin is equal to the first level.

11. The memory controller as claimed in claim 9, wherein when the first resistor is not coupled to a second resistor of the external host, the level of the specific pin is equal to the second level.

12. The memory controller as claimed in claim 8, further comprising:
a detection module generating a control signal according to the level of the specific pin.

13. The memory controller as claimed in claim 12, wherein when the level of the specific pin is equal to the first level, the control signal is in a first state and the first control module communicates with the external host via the first transmittal module according to the clock signal, and when the level of the specific pin is equal to the second level, the control signal is in a second state and the second control module communicates with the external host via the second transmittal module according to the clock signal.

14. The memory controller as claimed in claim 12, further comprising:
a first switch providing the clock signal to the first control module according to the control signal, wherein the first control module communicates with the external host via the first transmittal module according to the clock signal; and
a second switch providing the clock signal to the second control module according to the control signal, wherein the second control module communicates with the external host via the second transmittal module according to the clock signal.

15. An accessing system comprising:
a memory array storing data;
an external host sending a clock signal; and
a memory controller accessing the memory array according to the clock signal and comprising:
a first transmittal module transmitting data;
a specific pin coupled to a setting module;
a clock pin receiving a clock signal, wherein the first transmittal module and the clock pin constitute an embedded multimedia card (eMMC) interface;
a second transmittal module transmitting data, wherein the second transmittal module and the clock pin constitute a universal flash storage (UFS) interface;
a first control module accessing the memory array according to the clock signal and communicating with the external host via the first transmittal module when a level of the specific pin is at a first level; and a second control module accessing the memory array according to the clock signal and communicating with the external host via the second transmittal module when the level of the specific pin is at a second level, wherein the first level exceeds the second level, wherein the clock pin is shared by the first and second transmittal modules, wherein when the first control module communicates with the external host via the first transmittal module, simultaneously, the second control module stops working, and wherein when the second control module communicates with the external host via the second transmittal module, and simultaneously, the first control module stops working, and wherein each of the first and the second control modules receives a signal carried on the specific pin, but does not utilize the specific pin to transmit or receive communications with the external host.

16. The accessing system as claimed in claim 15, further comprising:
a first resistor comprising a first terminal and a second terminal, wherein the first terminal is coupled to the specific pin and the second terminal receives the second level.

17. The accessing system as claimed in claim 16, wherein when a second resistor of the external host is coupled to the first resistor in serial, the level of the specific pin is equal to the first level, and when the first resistor is not coupled to the second resistor, the level of the specific pin is equal to the second level.

18. The accessing system as claimed in claim 15, further comprising:
a detection module generating a control signal according to the level of the specific pin.

19. The accessing system as claimed in claim 18, wherein when the level of the specific pin is equal to the first level, the control signal is in a first state and the first control module communicates with the external host via the first transmittal module according to the clock signal, and when the level of the specific pin is equal to the second level, the control signal is in a second state and the second control module communicates with the external host via the second transmittal module according to the clock signal.

20. The accessing system as claimed in claim 18, further comprising:
a first switch providing the clock signal to the first control module according to the control signal, wherein the first control module communicates with the external host via the first transmittal module according to the clock signal; and
a second switch providing the clock signal to the second control module according to the control signal, wherein the second control module communicates with the external host via the second transmittal module according to the clock signal.

* * * * *